United States Patent [19]
Campbell

[11] Patent Number: 5,955,194
[45] Date of Patent: *Sep. 21, 1999

[54] SILICON CARBOXIDE COMPOSITE REINFORCED WITH CERAMIC FIBERS HAVING A SURFACE ENRICHED IN BORON NITRIDE

[75] Inventor: Scott Sager Campbell, Chicago, Ill.

[73] Assignee: AlliedSignal, Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/489,424

[22] Filed: Jun. 12, 1995

Related U.S. Application Data

[63] Continuation-in-part of application No. 08/068,356, May 27, 1993, abandoned, and application No. 08/248,903, May 25, 1994, abandoned.

[51] Int. Cl.$^6$ ............................. C03B 29/00; B32B 9/00
[52] U.S. Cl. ..................... 428/366; 428/373; 428/375; 428/384; 428/698; 501/11; 501/35; 501/94; 501/905; 427/255.1; 65/17.1
[58] Field of Search .................................. 428/373, 375, 428/384, 398, 366; 501/11, 35, 44, 405; 427/255.1; 65/17.1

[56] References Cited

U.S. PATENT DOCUMENTS

| | | | |
|---|---|---|---|
| 4,605,588 | 8/1986 | Simpson et al. | 428/288 |
| 4,642,271 | 2/1987 | Rice | 428/698 |
| 4,906,763 | 3/1990 | Paciorek et al. | 556/403 |
| 4,915,760 | 4/1990 | Singh et al. | 156/89 |
| 4,948,662 | 8/1990 | Simpson et al. | 428/288 |
| 5,132,254 | 7/1992 | Stempin et al. | 501/32 |
| 5,164,341 | 11/1992 | Chyung et al. | 501/8 |
| 5,180,694 | 1/1993 | Renlund et al. | 501/12 |
| 5,242,866 | 9/1993 | Leung et al. | 501/12 |

FOREIGN PATENT DOCUMENTS

| | | |
|---|---|---|
| 2647777 | 12/1990 | France . |
| 2266302 | 10/1993 | United Kingdom . |
| WO 90/12835 | 11/1990 | WIPO . |
| WO 94/20433 | 9/1994 | WIPO . |
| WO 94/27923 | 12/1994 | WIPO . |

OTHER PUBLICATIONS

Hurwitz et al., "Polymeric Routes to Silicon Carbide and Silicon Oxycarbide CMC" Ceramic Engineering and Science Proceedings, vol. 12, No. 7,8, Jul. 1991, pp. 1292–1303.
U.S. application No. 07/816,269, Leung, filed Dec. 1991.
U.S. application No. 08/096,494, Leung et al., filed Jul. 1993.
U.S. application No. 07/426,820, Leung et al., filed Oct. 1989.
U.S. application No. 07/523,620, Leung et al., filed May 1990.
U.S. application No. 07/654,168, Stranford et al., Feb. 1991.
U.S. application No. 07/464,470, Leung et al., filed Jan. 1990.
Prewo et al., "Fiber Reinforced Glasses and Glass–Ceramics for High Performance Applications" Ceramic Bulletin, vol. 65, No. 2, 1986.
Sheppard, L.M., "Toward Economical Processing of Composites" Ceramic Industry, Mar., 1994, pp. 79–83.
U.S. application No. 08/068,356, Campbell, filed May 1993.

*Primary Examiner*—Richard Weisberger

[57] ABSTRACT

An improved fiber reinforced glass composite includes a boron-containing refractory fiber having its surface enriched with boron nitride in a matrix of a black glass ceramic having the empirical formula $SiC_xO_y$ where x ranges from about 0.5 to about 2.0, preferably 0.9 to 1.6 and y ranges from about 0.5 to 3.0, preferably 0.7 to 1.8. Preferably the black glass ceramic is derived from cyclosiloxane or non-cyclic siloxane monomers containing a vinyl group attached to silicon and/or a hydride-silicon group. The boron nitride-containing fiber is the product of treating the boron-containing fiber with ammonia at a temperature between about 1100° C. and 1250° C. Fibrous failure rather than brittle failure under stress can be obtained.

27 Claims, No Drawings

SILICON CARBOXIDE COMPOSITE REINFORCED WITH CERAMIC FIBERS HAVING A SURFACE ENRICHED IN BORON NITRIDE

CROSS-REFERENCE TO RELATED APPLICATIONS

This is a continuation-in-part of U.S. Ser. No. 08/068,356 filed May 27, 1993, now abandoned, and a continuation-in-part U.S. Ser. No. 08/248,903 filed May 25, 1994, now abandoned.

PRIOR ART

The invention relates generally to composites in which a matrix material is reinforced with fibers. Composites with a polymer matrix are widely used for various purposes, but they are not generally applicable in situations where temperatures are expected to be above about 300° C. The present invention relates to ceramic fiber reinforced-glass matrix composites having application at temperatures which would destroy conventional polymeric materials.

Matrices have been suggested for use with fibers having high strength at elevated temperatures. Examples of such matrix materials are the glass and glass ceramics (Prewo et al., Ceramic Bulletin, Vol. 65, No. 2, 1986).

In U.S. Pat. No. 5,242,866 and related co-pending U.S. Ser. No. 07/816,269 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7–1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. Related black glasses are disclosed in co-pending U.S. Ser. No. 08/096,494 where cyclosiloxanes are polymerized with non-cyclic siloxanes and then pyrolyzed to form a black glass. The present invention involves the application of such black glasses to reinforcing fibers to form laminates very useful in high temperature applications.

In co-pending U.S. patent application Ser. No. 07/426,820 composites of refractory fibers with a black glass matrix were disclosed. Such composites have good physical properties but tend to exhibit brittle fracture with little evidence of fiber pullout.

Ceramic matrix composites which combine whiskers, particulates, staples, or continuous fibers with ceramic matrix offer a potential to overcome the catastrophic brittle failure inherent to monolithic ceramics. Among these reinforcement types, continuous fiber is the most effective means known for toughening ceramics. If brittle fracture is replaced by the graceful fibrous fracture, ceramic composites may be used reliably as an engineering material for structural and other high performance applications.

The type of failure is to large extent determined by the nature of the interface between the reinforcement fiber and the surrounding matrix. In ceramic composites, high toughness results when energy is absorbed as fibers pull out from the matrix as the composite cracks. Thus, a low interfacial stress or friction is needed to ensure fibrous fracture. If a strong interfacial bond exists, the crack will cut through the fiber without pulling out the fiber, resulting in a fracture behavior not much different from unreinforced monolithic ceramics. In co-pending U.S. patent applications Ser. No. 07/464,470 and 07/523,620 the use of a carbon interface in a silicon carboxide "black glass" matrix was shown to produce a composite having a high strain-to-failure and exhibiting fibrous fracture. Our present invention relates to the use of boron nitride interface in a silicon carboxide black glass matrix, which also produces a composite having improved strength at temperatures higher than those in which a carbon interfacial layer is useful.

Boron nitride coatings have been used for providing toughness to fiber-reinforced ceramic composites. Illustrative are U.S. Pat. Nos. 4,642,271, 4,906,763, and 4,915,760. Various methods of applying boron nitride coatings to the individual fibers are disclosed. Chemical vapor deposition using borazine or borazine compounds appear to be favored, but other reactions have been suggested such as reacting boron oxide with ammonia or boron trichloride with ammonia. Boron nitride coated fibers have been incorporated into a variety of matrices, including silicon carbide, zirconia, cordierite, and silicon nitride.

In co-pending U.S. patent application Ser. No. 07/654,168 the use of boron nitride coatings for black glass composites was suggested, with the preferred methods being chemical vapor deposition or coating fibers with boron-containing precursors followed by nitridation with $N_2$ or $NH_3$.

The process of U.S. Pat. No. 4,605,588 and U.S. Pat. No. 4,948,662 has now been investigated and it has been found to be useful for preparation of black glass composites reinforced with boron-containing ceramic fibers such as Nextel™ but unexpectedly, the conditions required were outside those patents, as initially disclosed in parent application U.S. Ser. No. 08/068,356. It has now been found that the physical properties of black glass composites can be further improved by controlled oxidation.

In *Ceramic Industry,* March 1994, reference is made to the process developed by the present inventors and it is stated that "long-term" studies show that the oxidation of composites results in higher failure strains, improved fiber pull-out and lower moduli.

SUMMARY OF THE INVENTION

In general, the invention is a fiber-reinforced glass ceramic composite in which the reinforcing fibers are boron-containing alumina-silica refractory fibers which have been nitrided at conditions which have been selected to enrich the surface of the fibers in boron nitride and thereby to achieve fibrous fracture when the composite is stressed, rather than brittle failure.

An improved fiber reinforced glass composite of the invention comprises (a) a boron-containing alumina-silica refractory fiber, particularly, Nextel™ 312 which is nitrided at conditions selected to provide a surface enriched in boron nitride and achieve fibrous fracture and, (b) a carbon-containing black glass ceramic composition having the empirical formula $SiC_xO_y$ where x ranges from about 0.5 to about 2.0, preferably from 0.9 to 1.6, and y ranges from about 0.5 to about 3.0, preferably from 0.7 to 1.8. The composite of the invention fails under stress in a fibrous rather than a brittle manner.

The refractory fibers are nitrided with ammonia to produce a surface enriched in boron nitride prior to fabrication and pyrolysis of the cyclosiloxanes to form the black glass matrix. Preferred conditions for forming such boron nitride coatings are nitridation with 5–100% $NH_3$ at temperatures of about 1100° C. to 1250° C., preferably 1125° C. to 1175° C. for 1 to 240 minutes, preferably 60 to 180 minutes.

Subsequent to the nitridation step, additional improvement in the physical properties of black glass composites can be accomplished by controlled oxidation at temperatures up to 800° C. for from 5 to 200 hours, generally 500° to 800° C., and preferably 600° to 700° C. for 20 to 100 hours, which can improve the stress-strain properties. Under some circumstances it is possible to prevent brittle failure resulting from insufficient nitridation.

In a preferred embodiment, the black glass ceramic composition (b) of the invention is the pyrolyzed reaction product of a polymer prepared from (1) a cyclosiloxane monomer having the formula

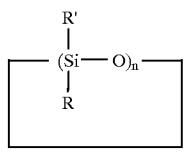

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst. The polymer product is pyrolyzed, preferably in an inert atmosphere, or in an oxygen-containing atmosphere at a rate exceeding 5° C./min to a temperature in the range of about 800° C. to about 1400° C. to produce the black glass ceramic.

In another aspect of this invention, the black glass ceramic composition (b) is the pyrolyzed reaction product of a polymer prepared by reacting in the presence of a catalytically effective amount of a hydrosilylation catalyst (1) cyclosiloxanes of formula

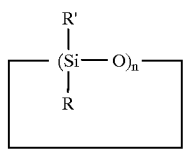

where n is an integer from 3 to about 20, R and R' are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups and (2) non-cyclic siloxanes having the formula

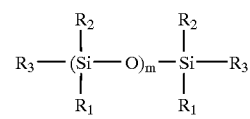

where
$R_1$, $R_2$, and $R_3$ are independently selected from hydrogen, an unsubstituted vinyl group, a substituted vinyl group, an alkyl group having 1 to 20 carbon atoms or aryl and where said siloxane contains at least two of either or both of hydrogen and unsubstituted or substituted vinyl groups m is an integer from 0 to 1,000 and thereafter converting the polymer to a black glass by heating in an inert atmosphere to a maximum temperature in the range of 750° C. to 1400° C. or in an oxygen-containing atmosphere to the same temperature range at a rate exceeding 5° C./min. The siloxanes of (2) are intended to include both linear siloxanes and their branched equivalent structures. In the special case where m is zero, the non-cyclic siloxane (2) becomes a silane having only one silicon atom.

In one alternative embodiment, a precursor polymer is produced by reacting the non-cyclic siloxanes described in (2) above (or a branched equivalent) in the absence of the cyclosiloxanes of (1) above. Such polymers are then pyrolyzed as described above to create a black glass.

In another embodiment, the invention comprises a method of preparing a fiber reinforced glass composite wherein the siloxane reaction product described above is combined with the nitrided boron-containing refractory fibers which may be in the form of woven fabric, unidirectionally aligned fibers or chopped fibers and whiskers. Plies of the boron nitride enriched fibers may be laid-up to form a green laminate and thereafter pyrolyzed, preferably in a non-oxidizing atmosphere at a temperature between about 800° C. and about 1400° C., preferably about 900° C., to form the black glass composite. The laminate may be reimpregnated with polymer solution and repyrolyzed in order to increase density. Alternatively, a resin transfer technique may be used in which fibers surface-enriched in boron nitride are placed in a mold and the black glass matrix precursor is added to fill the mold before curing to form a green molded product.

These fiber reinforced black glass composites show flexural strength greater than about 170 MPa at room temperature and fibrous, graceful fracture. A three-fold increase in flexural strength and a four-fold increase in strain at maximum stress has been obtained as compared with black glass composites where the boron-containing fibers have not been nitrided according to the invention. Further improvement is achieved by briefly oxidizing the composites as initially prepared.

DESCRIPTION OF THE PREFERRED EMBODIMENTS

The invention broadly speaking is a fiber-reinforced glass ceramic composite which achieves fibrous fracture rather than brittle fracture under stress by using boron-containing alumina-silica refractory fibers which have been nitrided under conditions which enrich the fiber surface in boron nitride. The preferred matrix material is a black glass ceramic as described below.

Black Glass Ceramic

The black glass ceramic used as the matrix has an empirical formula $SiC_xO_y$ wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis, preferably in a non-oxidizing atmosphere at temperatures between about 800° C. and about 1400° C. of a polymer made from certain siloxane monomers. If oxygen is present during pyrolysis, the heating should be carried out at a rate of at least 5° C./min to limit the oxidation of carbon.

The polymer precursor of the black glass ceramic may be prepared by subjecting a mixture containing cyclosiloxanes of from 3 to 30 silicon atoms alone, or mixed with non-cyclic siloxanes, to a temperature in the range of from about 10° C. to about 300° C. in the presence of 1–200 wt. ppm of platinum as a hydrosilylation catalyst for a time in the range of from about 1 minute to about 600 minutes. When the polymer is placed in a non-oxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each cyclosiloxane or non-cyclic siloxane monomer will contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

In one embodiment, the polymer precursor for the black glass ceramic may be defined generally as the reaction product of (1) a cyclosiloxane monomer having the formula

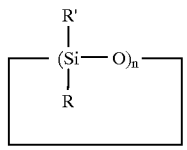

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from I to 20 carbon atoms and for the other monomers R is an alkene from about 2 to 20 carbon atoms in which one vinyl carbon is directly bonded to silicon and R' is an alkyl group of from 1 to 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

In a second embodiment, the black glass of the invention is derived from precursor polymers prepared by the reaction of (a) cyclosiloxanes containing silicon-hydride bonds and/or silicon-vinyl bonds with (b) non-cyclic siloxanes (or silanes with one silicon atom) also having silicon-hydride and/or silicon-vinyl bonds. Such precursor polymers may be described as the reaction product of (1) cyclosiloxanes of the formula

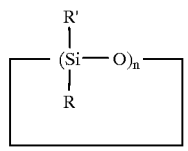

where n is an integer from 3 to about 20, R and R' are independently selected from hydrogen, an unsubstituted vinyl group, a substituted vinyl group, an alkyl group of from 1 to about 20 carbon atoms, or aryl and where said siloxane contains at least two of either or both of hydrogen and unsubstituted or substituted vinyl groups and (2) non-cyclic siloxanes having the formula

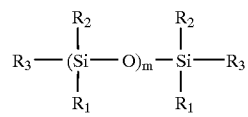

$R_1$, $R_2$, and $R_3$ are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups m is an integer from 0 to 1,000
said reaction taking place in the presence of an effective amount of a hydrosilylation catalyst.

It should be noted that in one case where m=O that the "non-cyclic siloxane" of (2) is actually a silane. Accordingly, it is to be understood that silanes having a single silicon atom are included within the term "non-cyclic siloxanes" as defined herein.

The siloxane molecules (1) and (2) are linked by the reaction of a hydrogen atom from one molecule and a vinyl group from the other. It is believed that the improved high temperature performance of black glasses of the invention is related to the relatively close coupling of the silicon and carbon atoms.

While unsubstituted vinyl groups are preferred, in some instances a substituted vinyl group may be selected to create carbon less closely bound to silicon atoms. An unsubstituted vinyl group may be written as —CH═CH$_2$ while a substituted vinyl group may be written as —CR$_a$═CR$_b$R$_c$ where R$_a$, R$_b$, R$_c$ may be hydrogen, alkyl groups from 1 to 20 carbons, aryl, alkaryl, or alkenyl, with at least some of R$_a$, R$_b$, R$_c$ being other than hydrogen. Additional carbon may be added also by including aryl groups or alkyl groups having more than 2 carbon atoms.

In one alternative embodiment, a precursor polymer is produced by reacting the non-cyclic siloxanes described in (2) above (or a branched equivalent) in the absence of the cyclosiloxanes of (1) above. Such polymers are then pyrolyzed as described above to create a black glass.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydrocyclotetrasiloxane. Such monomers may also contain alkyl groups such as for example, 1,3-divinyl-1,5-dihydro-3,5,7,7-tetramethylcyclosiloxane. Alternatively, two or more cyclosiloxane monomers may be polymerized. Such monomers would contain either a silicon hydride bond or a silicon-vinyl bond or both and the ratio of the two types of bonds should be about 1: 1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3-divinyl-1,5-dihydro-3,5,7,7-tetramethylcyclotetrasiloxane,
1,3,5-trivinyl-1,3,5,7,7-pentamethylcyclotetrasiloxane,
1,3,5-trihydro-1,3,5,7,7-pentamethylcyclotetrasiloxane,
1,3,5,7,9,11,13,15,17,19,21,23,25,27,29-pentadecavinyl-1,3,5,7,9,11,13,15,17,19,- 21,23,25,27,29-pentadecahydrocyclopentadecasiloxane,
1,3,5,7-tetrapropenyltetrahydrocyclotetrasiloxane,
1,3,5,7-tetrapentenyltetrapentylcyclotetrasiloxane,
and 1,3,5,7,9-pentadecenylpentapropylcyclopentasiloxane.
1,3,5,7,9-pentahydropentamethylcyclopentasiloxane
1,1,3,3,5,5,7,7-octahydrocyclotetrasiloxane
1,1,3,3,5,5,7,7,9,9,-decahydrocyclopentasiloxane, and
1,1,3,3,5,5,7,7,9,9,11,11-dodecahydrocyclohexasiloxane.

Examples of linear non-cyclic siloxanes are:
tetramethyldisiloxane,
hexamethyltrisiloxane,
1,1,2,3,3-pentamethyltrisiloxane,
octamethyltetrasiloxane,
polymethylvinylsiloxane,
polyhydromethylsiloxane,
heptamethyltetrasiloxane,
1,1,2,3,4,4,-hexamethyltetrasiloxane,
decamethylpentasiloxane,
1,1,2,3,4,5,5-heptamethylpentasiloxane,
1,1,3,3-tetravinyldimethyldisiloxane,
tetramethyldivinyldisiloxane,
hexamethyldivinyltrisiloxane,
1,1,2,3,3-pentamethyltrivinyltrisiloxane,
octamethyldivinyltetrasiloxane,
heptamethyltrivinyltetrasiloxane,
1,1,2,3,4,4-hexamethyltetravinyltetrasiloxane,
decamethyldivinylpentasiloxane, and
1,1,2,3,4,5,5-heptamethylpentavinylpentasiloxane, Examples of branched non-cyclic siloxanes are:
tetrakis dimethylsiloxysilane, and
tetrakis dimethylvinylsiloxysilane Examples of silanes (i.e, m is zero in formula (2)) are:
tetravinylsilane,
trivinylsilane,
divinylsilane,
trivinylmethylsilane,
divinylmethylsilane,
silane ($SiH_4$),
vinylsilane,
divinyldiethylsilane,
diphenyldivinylsilane,
phenylsilane,
methylphenylsilane,
diphenylsilane,
2-propenyldimethylsilane,
1-propenyldimethylsilane,
3-propenyldimethylsilane,
4-but-2-enyldiethylsilane,
p-tolylsilane, and
p-tolyldivinylsilane It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent. Resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

Reinforcing fibers useful in the composites of the invention are boron-containing refractory fibers used for applications where superior physical properties are needed. They include such materials as the Nextel™ fibers available from 3M which are typically 62–70% $Al_2O_3$ and 24–28% $SiO_2$ and contain 2 to 14 wt. % boria ($B_2O_3$). The larger amounts of boria are preferred, say from 12 to 14 wt. %.

The fibers may have various sizes and forms. They may be monofilaments from 1 $\mu$m to 200 $\mu$m diameter, chopped filaments or whiskers, or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, where improved tensile strength at high temperatures is desired, the fibers are nitrided to produce a surface enriched in boron nitride which reduces the bonding between the fibers and the black glass matrix. The surface sizings found on fibers as received or produced may be removed by solvent washing or heat treatment and the boron nitride enrichment developed by nitridation. The process described in U.S. Pat. No. 4,605,588 and U.S. Pat. No. 4,948,662 recommends a temperature of at least about 2200° F. (1204° C.) and preferably between 2200–2600° F. (1204° C.–1426° C.) so that boron diffuses to the surface of the fiber and reacts with $NH_3$ to form boron nitride. We have now found that in order to prepare black glass composites which fail in a fibrous manner that much lower temperatures are needed, particularly in the range of about 1100° C. to 1250° C., preferably 1125° C. to 1175° C. In fact, at the higher temperatures previously recommended, the black glass composites fail by brittle fracture. The composition of the nitriding gas is 5–100% $NH_3$, preferably 65 to 95% $H_2+N_2$ and 5 to 35% $NH_3$. The reaction time is 1 to 240 minutes, most preferably between 60 and 180 minutes at the selected temperature. The boron nitride produced is not visible even under conditions which would show ordinary thin surface coatings. However, the effect of enriching the surface of the fibers is seen (see Example 4–6 below), even though the boron nitride itself is not.

In co-pending applications Ser. Nos. 07/464,470 and 07/523,620 it is shown that coating reinforcing fibers with carbon provides an interfacial bond between the fibers and the matrix which induces graceful failure under stress and fibrous fracture. However, the carbon interface becomes unstable in an oxidizing atmosphere at above about 400° C. as oxidation of the carbon takes place. The boron nitride enriched surface of the present invention is stable up to about 600–700° C. where a carbon interfacial coating is not useful for continuous exposure.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with boron nitride-enriched reinforcing fibers. It would, for example, be feasible to combine fibers of the precursor polymer with fibers of the reinforcing material and then to coat the resulting fabric or mat. Alternatively, the reinforcing fibers could be coated with a solution of the precursor polymer and then formed into the desired shape. Coating could be done by dipping, spraying, brushing, or the like. In still another embodiment, the resin transfer technique can be employed in which the reinforcing fibers are placed in a mold and then the black glass precursor is added to fill the mold before curing to form a green molded product.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes. Alternatively, many continuous fibers may be coated, aligned in parallel, and then passed through a drying oven to form a continuous reinforced tape coated with black glass precursor.

In a second method, a woven or pressed fabric of the reinforcing fibers is infiltrated with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In resin transfer molding a mold with the required shape is filled with the desired reinforcement material. The reinforcement could be a preform having a 3-dimensional weave of fibers, a lay-up of fabric plies, a non-woven mat of chopped staple or bundled tows, or assemblies of whiskers, and such others as are familiar to those skilled in the art. The reinforcement material would be nitrided to produce an enriched surface of boron nitride to insure a weak bond between matrix and reinforcement in the final composite where improved tensile strength is desired. The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity i.e. <50 cp (mPa.s) of the neat monomer solution is exceptionally well suited for resin impregnation of thick wall and complex shape components. A neat liquid of intermediate viscosity between about 50–1000 cp (mPa.s) may also be used for impregnation of thin wall and hollow parts, such as tube, cylinder, honeycomb, and fin structures. This intermediate viscosity liquid may be produced by controlled partial polymerization of the monomers.

The filled mold is then heated to about 30° C.–150° C. for about ½–30 hours as required to cure the monomer solutions to a polymerized state. The specific cure cycle is tailored for the geometry and desired state of cure. For example, thicker wall sections require slower cures to prevent uneven curing and heat build-up due to the exothermic curing reaction. The cure cycle is tailored through control of the amount of catalyst added and the time-temperature cycle. External pressure may be used during the heating cycle as desired.

When the component is fully cured, it is removed from the mold. In this condition it is in a state equivalent to the composite made by lamination and autoclaving of prepreg plies. Further processing consists of the equivalent pyrolysis and impregnation cycles to be described for the laminated components.

Solvents for the black glass precursor polymers include hydrocarbons, such as octane, hexane, toluene, benzene, and xylene, and ethers, such as tetrahydrofuran, and halogenated compounds such as chloroform and carbon tetrachloride. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. The resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, there will be no adhesion between the plies and no flow of resin material and no bonding will occur.

Heating the composite to temperatures from about 800° C. up to about 1400° C. preferably in a non-oxidizing atmosphere (pyrolysis) converts the polymer into a black glass ceramic containing essentially only carbon, silicon, and oxygen. If oxygen is present, rapid heating at a rate of least 5° C./min is needed to limit the oxidation of carbon. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out by heating to the maximum temperature selected, holding at that temperature for a period of time determined by the size of the structure, and then cooling to room temperature. Little bulk shrinkage is observed for the black glass composites and the resulting structure typically has about 70–80% of its theoretical density.

Conversion of the polymer to black glass takes place between 430° C. and 1000° C. Three major pyrolysis steps were identified by thermogravimetric analysis at 430° C.–700° C., 680° C.–800° C. and 780° C.–950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure, still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density up to about 95% of the theoretical.

It has been shown in co-pending applications Ser. Nos. 07/464,470 and 07/523,620 that the high temperature strength of composites can be substantially improved by continued impregnation of the composite with black glass solutions, which is believed to seal off micropores in the black glass coating making it possible to defend the coating on the fibers against destructive oxidation.

The examples below illustrate the improved strength and strength retention after high temperature exposure obtained by nitriding a boron-containing fiber and forming a surface enriched in boron nitride prior to contacting them with the black glass precursors.

EXAMPLE 1

Polymer Precursor Preparation

The cyclosiloxane having a silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A mixture of 59 vol. % ViSi/41 vol. % HSi was mixed with 0.6 vol. % of a platinum-cyclovinylmethylsiloxane complex having 0.6 wt. % pt. The mixture was diluted with isooctane to give a 10 vol. % solution of the cyclosiloxane monomers. The solution was heated to reflux conditions (100° C.) and refluxed for about 70 minutes. Then, the solution was concentrated in a rotary evaporator at 50° C. to a concentration suitable for use in prepregging. The resin produced was poly(methylmethylenecyclosiloxane) (PMMCS). It was tacky at room temperature, but it was flowable at temperatures of about 70° C. or higher and thus suitable for use as a B-stage resin.

EXAMPLE 2

Nitridation of a Nextel™ 312 Fabric

Strips of Nextel™ 312 (boria-alumina silicate supplied by 3M) five harness satin weave fabric 4 inches×36 inches (101.6 mm×914.4 mm) were desized by heating to 600° C. in air for 1 hour in a tube furnace and then heated at temperatures between 1100° C. and 1250° C. for times between 1 and 240 minutes. A gas containing 84 vol. % $N_2$, 11 vol. % $H_2$, and 5 vol. % $NH_3$ was passed through the furnace during the periods when the temperature was being raised and then held at the desired maximum. After treatment, the furnace was cooled while dry $N_2$ was passed through. The treated fabrics were then used to make a reinforced black glass ceramic.

EXAMPLE 3

Preparation of Test Specimens

A 45–60 wt. % poly(methylmethylenecyclosiloxane) (PMMCS) solution in isooctane was used for making a prepreg. Boron nitride enriched Nextel™ fibers prepared as in Example 2 were impregnated with the PMMCS resin by passing the fabric strip through the resin solution and drying in air for 16 hours. The prepreg contained 40–45% by weight of PMMCS and 60–55% by weight fiber. The fiber areal weight, which is defined as the weight of fiber per unit area in the prepreg, was 254.3 gm/m².

4 inches×4 inches (102 mm×102 mm) plies were cut from the prepreg. 8 plies were laid-up to form a laminate. This laminate was placed in a vacuum bag and consolidated in an autoclave using the following procedure:

1. debulking at 65° C. for ½ hour under vacuum,
2. heating up to 150° C. at 100 psig (689.7 kPa gauge) nitrogen pressure over 1 hour, and holding at 150° C. for 15 minutes,
3. cooling to 70° C. while maintaining the pressure,
4. releasing the pressure and free cooling to room temperature.

The resin flowed and solidified during the autoclave curing. Loss of the resin through bleeding was estimated to be less than 2% with respect to the total weight of the laminate.

The consolidated green laminate was then machine cut into 0.25 inches×3 inches (6.4 mm×76.2 mm) test bars with average thickness of 0.07 inches (1.78 mm). The green test bars were then pyrolyzed in flowing nitrogen (flowrate=ca. 500 cubic cm per minute) to convert the PMMCS into black glass matrix composites using the following heating program:

1. heat to 480° C. at 2° C./min,
2. hold at 480° C. for 2 hours,
3. heat from 480° C. to 900° C. at 1.5° C./min,
4. cool to room temperature at 3.5° C./min.

The density of the as-pyrolyzed test bars was 1.5 gm/cc with a char yield of 82.7%. The test bars were then infiltrated with the neat monomer liquid without solvent. After gelling the sol at 55° C., the infiltrated bars were then pyrolyzed by heating in nitrogen atmosphere at 90° C./hr to 900° C., held for 0.5 hrs. and then cooled to room temperature at 300° C./min. A total of five impregnations were used to increase the density of the composite to about 1.99 gm/cc. Bars impregnated five times contained 30–50% Nextel™ fiber by volume. Open porosity was estimated to be about 10%.

EXAMPLE 4

Testing for Flexural Strength

Three-point bend tests were performed on the nitrided Nextel™ 312 fiber reinforced black glass bars prepared in Example 3 using an Instron 4507 universal testing machine. The span of the fixture was 2.75 inches (69.9 mm) and the cross-head speed was 0.5 mm/min. Flexural strengths for various nitridation temperatures and times are summarized below.

TABLE A

| Nitriding Conditions F. Stress | F. Strain | Failure Mode |
|---|---|---|
| 1250° C./10 minutes 28 Kpsi(193 MPa) | 0.38% | Fibrous |
| 1250° C./20 minutes 29 Kpsi(200 MPa) | 0.29% | Fibrous |
| 1250° C./35 minutes 20 Kpsi(138 MPa) | 0.26% | Semi-Fibrous |
| 1250° C./50 minutes 15 Kpsi(103 MPa) | 0.23% | Semi-Fibrous |
| 1250° C./75 minutes 12 Kpsi(83 MPa) | 0.14% | Brittle |
| 1225° C./20 minutes 28 Kpsi(193 MPa) | 0.31% | Fibrous |
| 1225° C./35 minutes 29 Kpsi(200 MPa) | 0.30% | Fibrous |
| 1225° C./50 minutes 29 Kpsi(200 MPa) | 0.29% | Semi-Fibrous |
| 1200° C./20 minutes 26 Kpsi(179 MPa) | 0.35% | Fibrous |
| 1200° C./40 minutes 25 Kpsi(172 MPa) | 0.37% | Fibrous |
| 1200° C./70 minutes 24 Kpsi(165 MPa) | 0.31% | Fibrous |
| 1175° C./35 minutes 29 Kpsi(200 MPa) | 0.38% | Fibrous |
| 1150° C./35 minutes 30 Kpsi(207 MPa) | 0.34% | Fibrous |
| 1125° C./35 minutes 31 Kpsi(214 MPa) | 0.40% | Fibrous |
| 1100° C./35 minutes 15 Kpsi(103 MPa) | 0.16% | Brittle |

The results shown in Table A suggest the following conclusions:

increasing nitriding temperature causes a reduction in the stress which a composite can accept before failure; therefore, the temperature should be kept as low as possible.

increasing nitriding time at a given temperature reduces the stress which a composite can accept before failure; therefore, the nitriding time should be kept as short as possible the failure mode is adversely affected by an increase in nitriding severity, i.e. by increasing temperature and/or time; therefore nitriding conditions should be as mild as possible while retaining a fibrous failure mode.

if nitriding conditions are too mild brittle failure occurs, which may be attributed to insufficient enrichment of the fibers with boron nitride.

It may also be concluded that the nitriding conditions recommended in the '588 and '662 patents are not applicable to composites made with black glass (silicon carboxide). The objective of the nitriding treatment is to provide fibers which do not adhere strongly to the black glass matrix and therefore exhibit fibrous failure. Strong attachment of the fibers to the matrix will result in brittle failure, but so will nitriding the fibers to such as extent that they lose strength.

EXAMPLE 5

Improved Nitridation of a Nextel™ 312 Fabric

Strips of Nextel™ 312 (boria-alumina silicate supplied by 3M) five harness satin weave fabric 4 inches×36 inches (101.6×914.4 mm) were desized by heating to 600° C. in air for 1 hour in a tube furnace and then heated at temperatures between 1100° C. and 1250° C. for times between 1 and 240 minutes. A gas containing 20 vol. % $NH_3$ and 80 vol. % $H_2$ was passed through the furnace during the periods when the temperature was being raised and then held at the desired maximum. After treatment, the furnace was cooled while dry $N_2$ was passed through. These treated fabrics then were used to make a reinforced black glass ceramic as in Example 3 and tested for mechanical properties as in Example 4.

Flexural strengths for the various nitridation temperatures and times are summarized below:

TABLE B

| Conditions (° C./HR) | Stress (KSI) | Strain (%) | Modulus (MSI) |
|---|---|---|---|
| 1100/3.0 | 29.2 | 0.32 | 11.2 |
| 1100/4.0 | 32.7 | 0.36 | 11.4 |
| 1150/0.5 | 38.0 | 0.46 | 11.2 |
| 1150/1.0 | 45.8 | 0.63 | 10.4 |
| 1150/1.5 | 45.7 | 0.67 | 9.2 |
| 1150/2.0 | 45.5 | 0.52 | 11.6 |
| 1150/2.5 | 42.4 | 0.49 | 11.3 |
| 1150/3.0 | 46.1 | 0.54 | 11.3 |
| 1150/4.0 | 40.8 | 0.47 | 11.0 |
| 1175/1.5 | 46.4 | 0.59 | 10.4 |
| 1200/1.5 | 43.1 | 0.54 | 10.6 |
| 1225/1.5 | 46.0 | 0.57 | 10.7 |
| 1250/0.0 | 48.6 | 0.59 | 10.7 |
| 1250/0.08 | 49.4 | 0.65 | 10.2 |
| 1250/0.5 | 45.4 | 0.56 | 11.5 |

The results shown in Table B suggest the following:

Increasing the ammonia content of the nitridation atmosphere increases the stress which a composite can accept before failure.

Increasing the nitridation time under the condition of increased ammonia content of the nitridation atmosphere increases the stress which a composite can accept before failure.

To further explore the process parameters, additional samples were nitrided at 1150° C. for 2.0 hours in atmospheres containing 5–100 vol. % $NH_3$ and 0–95 vol. % $H_2$. The fabric was used to fabricate reinforced black glass ceramics samples as in Example 3 which were evaluated for mechanical properties as in Example 4. The results of the mechanical evaluation are summarized below:

TABLE C

| % $H_2$/% $NH_3$ | Stress (KSI) | Strain (%) | Modulus (MSI) |
|---|---|---|---|
| 95/5 | 41.9 | 0.72 | 11.2 |
| 90/10 | 44.8 | 0.62 | 10.4 |
| 80/20 | 45.5 | 0.52 | 11.6 |
| 65/35 | 52.8 | 0.79 | 12.6 |
| 50/50 | 35.2 | 0.40 | 10.8 |
| 0/100 | 31.9 | 0.35 | 11.0 |

The results shown in Table C suggest that the optimum ammonia content of the nitriding gas is around 35 vol. % and should be considered a maximum. The minimum ammonia content should be around 10 vol. %.

EXAMPLE 6

Nextel™ 312 fibers were treated at the preferred nitridation conditions, i.e. 1175° C. for 35 minutes. The fibers surfaces were analyzed by XPS. The data are shown in the following table:

TABLE E

| Element | As-Prepared Atomic % | Ratio to B |
|---------|---------------------|------------|
| B 1s    | 31.74               | 1          |
| O 1s    | 9.02                | 0.28       |
| Al 2p   | 1.02                | 0.032      |
| N 1s    | 34.32               | 1.08       |
| Si 2p   | 1.57                | 0.05       |
| C 1s    | 22.33               | 0.70       |

This comparison shows that the nitrogen-to-boron ratio is consistent with boron nitride indicating the presence of boron nitride on the fiber surfaces.

I claim:

1. A fiber reinforced glass composite comprising
   (a) boron-containing refractory fibers having a surface enriched in boron nitride provided by nitriding said fibers at a temperature of about 1100° C. to 1250° C. with a gas containing 5–100% $NH_3$ for 1 to 240 minutes;
   (b) a carbon-containing black glass ceramic composition having the empirical formula $SiC_xO_y$ wherein x ranges from about 0.5 to about 2.0 and y ranges from about 0.5 to about 3.0.

2. The fiber reinforced glass composite of claim 1 wherein x ranges from 0.9–1.6 and y ranges from 0.7–1.8.

3. A composite of claim 1 wherein said fibers are nitrided at a temperature of 1125° C. to 1175° C. for 60 to 180 minutes in the presence of a gas containing 10–20% $NH_3$.

4. The composite of claim 1 wherein said black glass ceramic composition (b) is the pyrolyzed reaction product of
   (1) a cyclosiloxane monomer having the formula

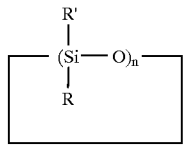

where n is an integer from 3 to 30, R is hydrogen, and R' is an alkene of from 2 to 20 carbon atoms in which one vinyl carbon atom is directly bonded to silicon or
   (2) two or more different cyclosiloxane monomers having the formula of (1)
      where for at least one monomer R is hydrogen and R' is an alkyl group having from 1 to 20 carbon atoms and for the other monomers R is an alkene from 2 to about 20 carbon atoms in which one vinyl carbon is directly bonded to silicon and R' is an alkyl group of from 1 to about 20 carbon atoms or
   (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

5. The composite of claim 1 wherein said black glass ceramic composition (b) is the pyrolyzed reaction production of (1) cyclosiloxanes of the formula

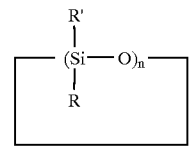

where n is an integer from 3 to about 20,
R and R' are independently selected from hydrogen, an unsubstituted vinyl group, a substituted vinyl group, an alkyl group having 1 to 20 carbon atoms, or aryl and where said siloxane contains at least two of either or both of hydrogen and substituted or unsubstituted vinyl groups and
(2) non-cyclic siloxanes having the formula

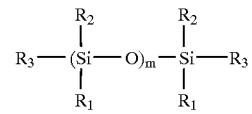

where $R_1$, $R_2$, and $R_3$ are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups
m is an integer from 0 to 1,000, the reaction of (1) and (2) taking place in the presence of an effective amount of a hydrosilylation catalyst.

6. A precursor polymer of claim 5 wherein (1) is poly(vinylmethylcyclosiloxane).

7. A precursor polymer of claim 5 wherein (2) is polyhydromethylsiloxane.

8. The fiber reinforced glass composite of claim 4 wherein said black glass ceramic composition is the pyrolyzed reaction product of poly(vinylmethylcyclosiloxane) and poly(methylhydrocyclosiloxane).

9. The fiber reinforced glass composite of claim I wherein the boron-containing refractory fibers are boron-containing aluminosilicate fibers.

10. The fiber reinforced glass composite of claim 9 wherein said refractory fibers contain 2–14 wt. % boria.

11. A method of preparing fiber reinforced glass composites comprising:

(a) preparing a polymer by either (a') reacting (1) a cyclosiloxane monomer having the formula

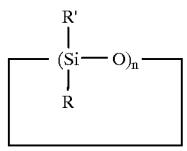

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 10 carbon atoms and for the other monomers R is an alkene from 2 to 20 carbon atoms in which one vinyl carbon is directly bonded to silicon and R' is an alkyl group of from 1 to 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to 20 carbon atoms, and at least some of said monomers contain each of said hydrogen, alkene, and alkyl moieties, said reaction taking place in the presence of an effective amount of hydrosilylation catalyst; or (a") reacting (1') cyclosiloxanes of the formula

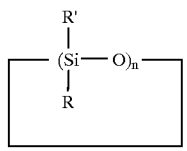

where n is an integer from 3 to about 20,

R and R' are independently selected from hydrogen, an unsubstituted vinyl group, a substituted vinyl group, an alkyl group have 1 to 20 carbon atoms, or aryl and where said siloxane contains at least two of either or both of hydrogen and substituted or unsubstituted vinyl groups and (2') non-cyclic siloxanes having the formula

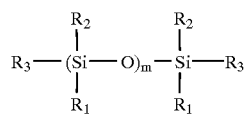

where $R_1$, $R_2$, and $R_3$ are independently selected from hydrogen, an unsubstituted vinyl group, a substituted vinyl group, an alkyl group having I to 20 carbon atoms, or aryl and where said siloxane contains at least two of either or both of hydrogen and unsubstituted or substituted vinyl groups m is an integer from 0 to 1,000, the reaction of (1') and (2') taking place in the presence of an effective amount of a hydrosilylation catalyst,
  (b) applying the reaction product of (a) to at least one boron-containing refractory fiber having a surface enriched in boron nitride provided by nitriding said fibers at a temperature of about 1100° C. to 1250° C.
with a gas containing 5–100% $NH_3$ for 1 to 240 minutes to form a prepreg;
  (c) laying-up plies of the prepreg of (b) to form a green structure;
  (d) curing the green structure of (c) at a temperature not greater than 250° C.;
  (e) pyrolyzing the cured structure of (d) at a temperature of about 800° C. to about 1400° C. in non-oxidizing atmosphere;
  (f) recovering the pyrolyzed product of (e) as the fiber reinforced glass composite;
  (g) impregnating the pyrolyzed product of (f) with the reaction product of (a);
  (h) pyrolyzing the impregnated product of (g) at 800° C.–1400° C.;
  (i) repeating steps (g) and (h) to achieve the desired density.

12. The method of claim 11 wherein the pyrolysis of (e) is carried out at a temperature of about 900° C.

13. The method of claim 11 wherein said refractory fibers of (b) are in the form of a woven fabric.

14. The method of claim 11 wherein said refractory fibers of (b) are unidirectional and continuous.

15. The method of claim 11 wherein said fibers are nitrided at a temperature of 1125° C. to 1175° C. for 60 to 180 minutes in the presence of a gas containing 10–20% $NH_3$.

16. The method of claim 11 wherein said product of (i) is oxidized at a temperature up to 800° C. for 5 to 200 hours to improve the stress-strain properties of said product.

17. The method of claim 16 wherein said product of (i) is oxidized at a temperature of about 600° to 700° C. for 20 to 100 hours.

18. A method of preparing fiber reinforced glass composites comprising:
  (a) placing into a mold at least one boron-containing refractory fiber, having a surface enriched in boron nitride provided by nitriding said fibers at a temperature of about 1100° C. to 1250° C. with a gas containing 5–100% $NH_3$ for 1 to 240 minutes;
  (b) filling the fiber-containing mold of (a) with either (b') (1) a cyclosiloxane monomer having the formula

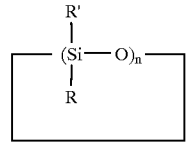

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (2) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to 20 carbon atoms and at least some of said monomers contain each of said hydrogen, alkene, and alkyl moieties, and an effective amount of hydrosilylation catalyst; or (b") (1') cyclosiloxanes of the formula

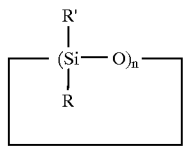

where n is an integer from 3 to about 20,
R and R' are independently selected from hydrogen, an unsubstituted vinyl group, a substituted vinyl group, an alkyl group have 1 to 20 carbon atoms, or aryl and where said siloxane contains at least two of either or both of hydrogen and substituted or unsubstituted vinyl groups and (2') non-cyclic siloxanes having the formula

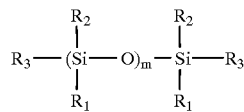

where $R_1$, $R_2$, and $R_3$ are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups
m is an integer from 0 to 1,000, the reaction of (1') and (2'), taking place in the presence of a effective amount of a hydrosilylation catalyst,
(c) reacting the monomers of (b) at a temperature of about 30° C. to 150° C. to form a green composite;
(d) pyrolyzing the green composite of (c) at a temperature of about 800° C. to about 1400° C. in non-oxidizing atmosphere;
(e) recovering the pyrolyzed product of (d) as the fiber reinforced glass composite;
(f) impregnating the pyrolyzed product of (e) with the reaction product of the monomers of (b);
(g) pyrolyzing the impregnated product of (f) at 800° C.–1400° C.;
(h) repeating steps (f) and (g) to achieve the desired density.

19. The method of claim 18 wherein the pyrolysis of (d) is carried out at a temperature of about 900° C.

20. The method of claim 18 wherein said refractory fiber is a preform having a three-dimensional weave.

21. The method of claim 18 wherein said refractory fiber is a lay-up of fabric plies.

22. The method of claim 18 wherein said refractory fiber is a staple fiber.

23. The method of claim 18 wherein said refractory fiber is an assembly of whiskers.

24. The method of claim 18 wherein the siloxane monomer of (b) is polymerized to form a liquid having a viscosity of about 50 to 1000 mPa.s.

25. The method of claim 18 wherein said fibers are nitrided at a temperature of 1125° C. to 1175° C. for 60 to 180 minutes in the presence of a gas containing 10–20% $NH_3$.

26. A fiber reinforced composite comprising
(a) boron-containing refractory fibers having a surface enriched in boron nitride provided by nitriding said fibers at a temperature of about 1100° C. to 1250° C. with a gas containing 5 to 100% $NH_3$ for 1 to 240 minutes;
(b) a ceramic matrix for said fibers of (a).

27. The method of enriching the surface of the boron-containing fibers with boron nitride by exposing said fibers to a temperature of about 1100° C. to 1250° C. in the presence of a gas containing 5–100% $NH_3$ for 1 to 240 minutes.

* * * * *